(12) United States Patent
Huynh-Ba

(10) Patent No.: US 6,433,085 B1
(45) Date of Patent: Aug. 13, 2002

(54) COATING COMPOSITION

(75) Inventor: Gia Huynh-Ba, Hockessin, DE (US)

(73) Assignee: E.I. Du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/598,748

(22) Filed: Jun. 21, 2000

(51) Int. Cl.$^7$ .................................................. C08F 8/30
(52) U.S. Cl. ...................................................... 525/123
(58) Field of Search ......................................... 525/123

(56) References Cited

U.S. PATENT DOCUMENTS

| | | | |
|---|---|---|---|
| 3,259,511 A | 7/1966 | Rairdon et al. | 106/263 |
| 3,485,779 A | 12/1969 | Gast et al. | 160/18 |
| 3,560,235 A | 2/1971 | Sarfas et al. | 106/308 |
| 3,637,539 A | 1/1972 | Wolff et al. | 260/2.5 |
| 3,637,540 A | 1/1972 | Wolff et al. | 260/2.5 AM |
| 3,726,838 A | 4/1973 | Elmer et al. | 260/77.5 AQ |
| 3,892,687 A | 7/1975 | Bechara et al. | 260/2.5 AC |
| 3,963,680 A | 6/1976 | O'Keefe et al. | 260/77.5 NC |
| 3,971,764 A | 7/1976 | Schurmann et al. | 260/77.5 AM |
| 4,267,044 A | 5/1981 | Kroplinski et al. | 210/321.2 |
| 4,274,933 A | 6/1981 | Kamada et al. | 204/159.24 |
| 4,291,097 A | 9/1981 | Kamada et al. | 428/412 |
| 4,433,127 A | 2/1984 | Sugiyama et al. | 528/17 |
| 4,677,029 A | 6/1987 | Frisch et al. | 428/423.1 |
| 4,729,792 A | 3/1988 | Seitz | 106/22 |
| 4,785,032 A | 11/1988 | Touhasent | 524/42 |
| 4,946,872 A | 8/1990 | Thomas et al. | 521/159 |
| 4,990,583 A | 2/1991 | Wamprecht et al. | 526/271 |
| 5,041,477 A | 8/1991 | Hays | 524/88 |
| 5,159,051 A | 10/1992 | Onwumere et al. | 528/67 |
| 5,221,701 A | 6/1993 | Paar et al. | 523/404 |
| 5,266,669 A | 11/1993 | Onwunaka et al. | 528/28 |
| 5,279,862 A | 1/1994 | Corcoran et al. | 427/407.1 |
| 5,286,782 A | 2/1994 | Lamb et al. | 524/507 |
| 5,352,754 A | 10/1994 | Rhodes et al. | 528/28 |
| 5,354,797 A | 10/1994 | Anderson et al. | 524/285 |
| 5,391,630 A | 2/1995 | Miwa et al. | 525/285 |
| 5,486,561 A | 1/1996 | Hirano et al. | 524/451 |

FOREIGN PATENT DOCUMENTS

| | | |
|---|---|---|
| JP | 59213428 A | 12/1984 |
| JP | 60177013 | 9/1985 |
| JP | 07118364 | 5/1995 |
| WO | WO 93/03104 | 2/1993 |
| WO | WO 99/23131 | 5/1999 |

Primary Examiner—Edward J. Cain
(74) Attorney, Agent, or Firm—Steven C. Benjamin

(57) ABSTRACT

The present invention provides (i) a novel composition which is the polyol reaction product polyol made by mixing together a polyhydroxyl-tertiary amine, at least two of the hydroxyl groups of said amine being indirectly bonded to a nitrogen atom of said amine through a chain containing at least two carbon atoms, with an organic polyisocyanate, essentially all the isocyanate groups of said polyisocyanate being reacted with hydroxyl groups of said amine, and (ii) a coating composition containing a film forming binder and a volatile organic liquid carrier, said binder containing (I) hydroxyl-containing acrylic polymer and (II) the novel composition (i).

11 Claims, No Drawings

COATING COMPOSITION

BACKGROUND OF THE INVENTION

1. Field of the Invention

This invention relates to coating compositions which are especially useful for clear coating over a colored base coat.

2. Description of Related Art

U.S. Pat. No. 5,279,862 discloses a clear coating composition which can be used as the clear coat of a motorized vehicle clear coat/color coat finish. The clear coating composition has a film-forming binder and volitile organic liquid carrier, the binder including hydroxy functional acrylic polymer and organic polyisocyanate and is characterized by rapid curing to form a finish that is tack free and can be buffed as soon as 3–4 hours after application, resulting in increased productivity of the paint shop.

Even more rapid curing of the clear coat is desired for further increase in paint shop productivity. A catalyst for the hydroxy-isocyanate crosslinking reaction is present in the clear coating composition, typically an organo tin compound. When the amount of catalyst is increased to speed-up the cure, other problems arise, including decreased potlife and reduced coating quality. In the latter case, the faster cure entraps liquid carrier within the dried clear coating, causing the coating to have poor gloss and distinctness of image.

There are other indicia of increased productivity, e.g. how soon after application the film coating dries sufficiently to be dust-free, so that the painted article (vehicle) can be moved from the paint booth, to make room for the next vehicle to be painted. The vehicle can be moved outside the paint shop, i.e. into the open air, only after the film coating has dried further so as to be free of water spotting damage.

SUMMARY OF THE INVENTION

The present invention provides (a) a coating composition which forms film coatings which provide improved productivity as determined by one or more of the indicia of rapidly becoming dust-free and water spot resistant, and/or rapid curing sufficiently to be buffed, all occuring at ambient temperature (20° C.), (b) a novel binder component for use in (a), and (c) a novel ingredient for use in (b). The coating composition (a) of the present invention contains a film forming binder and a volatile organic liquid carrier binder, wherein the binder contains (A) hydroxyl-containing acrylic polymer and polyol prepared by reacting together polyhydroxyl-tertiary amine with organic polyisocyanate, the polyhydroxyl-tertiary amine having at least two hydroxyl groups being indirectly bonded to a nitrogen atom of said amine through a chain containing at least two carbon atoms, essentially all of the isocyanate groups of said organic polyisocyanate being reacted with hydroxyl groups of said amine, (B) organic polyisocyanate, the ratio of equivalents of isocyanate in (B) per equivalent of hydroxyl groups in (A) being in the range of 0.5/1 to 3.0/1, and (C) an effective amount of catalyst to cure said composition.

The novel binder component (b) of the present invention is the combination of the hydroxyl-containing acrylic polymer and polyol described as component (A) above, preferably also contained in a volatile organic liquid carrier, the combination of the hydroxyl-containing acrylic polymer and the polyol also constituting a film-forming binder. Components (A) and (B) are packaged separately and are combined just prior to application, because component (B) crosslinks the combined components. Component (C) speeds up the crosslinking reaction and can be provided to the crosslinking reaction either as part of (A), (B), or as a separate component. In any event, the pot-life of the combined components is sufficient to enable the combined components to be applied, typically by spraying, onto the substrate to be coated, typically an vehicle body part, including the entire vehicle body.

The curing of the composition after it is applied to form the film coating occurs by the isocyanate groups of (B) reacting with the hydroxyl groups of both the acrylic polymer and the polyol of (A) to form urethane linkages, whereby the cured coating film is a polyurethane. The polyol both speeds up the curing reaction, as does the catalyst (C), and becomes part of the crosslinked structure by the reaction of its hydroxyl groups with the isocyanate groups. Thus, the polyol is present in an effective amount to increase the crosslinking reaction rate during curing of the composition. Preferably, the amount of said acrylic polymer is 40–99 wt % and the amount of polyol is 1–60 wt %, based on the total weight of (A).

The novel ingredient (c) of the present invention is the polyol of component (A). It is desirable that the polyol is essentally free of isocyanate groups so that there will be no appreciable reaction between the polyol and the hydroxyl-containing acrylic polymer when these ingredients are combined into component (A), otherwise there would be premature crosslinking of component (A) that would interfere with the application of the coating composition such as by spraying and would give a defective coating, if sprayable at all. The reaction between the polyhydroxyl-tertiary amine and the polyisocyanate to form the polyol of component (A) is spontaneous, i.e. it occurs merely by mixing these ingredients together at ambient temperature and under atmospheric pressure. The polyol reaction product is a mixture of reaction products in which different number of molecules of the amine react with a single molecule of the poyisocyanate and in which one molecule of the amine may react with a plurality of molecules of the polyisocyanate. The fact that essentially all of the isocyanate groups of the polyisocyanate are used up in the reaction and that the reaction product is a polyol indicates that an excess of hydroxyl groups provided by the polyhydroxyl-tertiary amine is present in the reaction. These hydroxyl groups in the polyol bear the same relationship to the amine nitrogen as in the polyhydroxl-tertiary amine reactant.

Film coatings formed from compositions (a) of the present invention typically become dust-free within 10 min and even within 5 min, free of water spot damage within 30 min, and can be buffed in less than three hours and possibly as early as one hour after application, all with ambient temperature drying and cure, without sacrifice in either the ease of applying the coating composition or the ultimate quality of the clear coat. Of course, the film coating becomes tack-free prior to becoming buffable. Thus, the coating compositions of the present invention are highly useful for repairing a clearcoat/colorcoat finish of a vehicle using the coating composition as a refinish clearcoat, which process allows the vehicle to be moved outside and the finish to be sanded (wet or dry), buffed or polished, if necessary, to remove minor imperfections and enhance gloss within a short period of time after application. This greatly improves the productivity of a refinish operation by allowing more vehicles to be processed in the same or in less time.

DETAILED DESCRIPTION OF THE INVENTION

The coating composition (a) of this invention is a low VOC (volatile organic content) composition that is particularly suited for use as a clearcoat in automotive refinishing. The composition contains a film forming binder and an organic liquid carrier which is usually a solvent for the binder. Since the invention is directed to a low VOC composition, the amount of organic solvent used in the liquid carrier portion results in the composition having a VOC content of less than 0.6 kilograms per liter (5 pounds per gallon) and preferably in the range of about 0.25–0.53 kilograms (2.1–4.4 pounds per gallon) of organic solvent per liter of the composition, as determined under the procedure provided in ASTM D-3960.This usually translates to a film forming binder content (components (A)+(B)+(C)) of about 25–90% by weight and an organic liquid carrier content of about 10–75% by weight, preferably about 30–55% by weight binder and 45–70% by weight carrier. Component (A), by itself can have the same solids content in organic liquid carrier, with or without the presence of component (C) in component (A). "Solids content" as used herein refers to the film-forming binder content of the composition, i.e. although the binder is in solution in the carrier, upon evaporation of the carrier, solid coating film of the binder remains, The hydroxyl functional acrylic polymer used in the hydroxyl component of the binder is prepared by conventional solution polymerization techniques in which monomers, solvents and polymerization catalyst are charged into a conventional polymerization reactor and heated to about 60–200° C. for about 0.5–6 hours to form a polymer having a weight average molecular weight (Mw) of preferably about 2,000–13,000, more preferably about 3,000–11,000.

All molecular weights disclosed herein are determined by GPC (gel permeation chromatography) using polymethyl methacrylate standard, unless otherwise noted.

The acrylic polymer thus formed also has a glass transistion temperature (Tg) generally of at least 20° C. and preferably about 40–80° C.

All glass transition temperatures disclosed herein are determined by DSC (differential scanning calorimetry).

Typically useful polymerization catalysts are azo type catalysts such as azo-bis-isobutyronitrile, 1,1'-azo-bis (cyanocylohexane), acetates such as t-butyl peracetate, peroxides such as di-t-butyl peroxide, benzoates such as t-butyl perbenzoate, octoates such as t-butyl peroctoate and the like.

Typical solvents that can be used are ketones such as methyl amyl ketone, methyl isobutyl ketone, methyl ethyl ketone, aromatic hydrocarbons such as toluene, xylene, alkylene carbonates such as propylene carbonate, n-methyl pyrrolidone, ethers, ester, such as butyl acetate, and mixtures of any of the above.

The hydroxyl functional acrylic polymer is preferably composed of a mixture of monomers, predominantly (meth) acrylic which copolymerize together to provide the application and cured coating film characteristics desired polymerized. In accordance with the present invention it is important that the acrylic polymer also contain hydroxyl groups provided by one or more comonomers used to form the acrylic polymer. The preferred mixture of comonomers is styrene, a methacrylate which is either methyl methacrylate, isobornyl methacrylate, cyclohexyl methacrylate or a mixture of these monomers, a second methacrylate monomer which is either n-butyl methacrylate, isobutyl methacrylate or ethyl hexyl methacrylate or a mixture of these monomers and a hydroxy alkyl methacrylate or acrylate that has 1–8 carbon atoms in the alkyl group such as hydroxy ethyl methacrylate, hydroxy propyl methacrylate, hydroxy butyl methacrylate, hydroxy ethyl acrylate, hydroxy propyl acrylate, hydroxy butyl acrylate and the like.

A preferred acrylic polymer contains about 5–30% by weight styrene, 1–50% by weight of the methacrylate, 30–60% by weight of the second methacrylate and 10–40% by weight of the hydroxy alkyl methacrylate. The total percentage of monomers in the polymer equal 100%. One particularly preferred acrylic polymer contains the following constituents in the above percentage ranges: styrene, methyl methacrylate, isobutyl methacrylate and hydroxy ethyl methacrylate. Another preferred acrylic polymer contains the following constituents in the above percentage ranges: styrene, isobornyl methacrylate, ethyl hexyl methacrylate, hydroxy ethyl methacrylate and hydroxy propyl methacrylate. Still another preferred acrylic polymer contains the following constituents in the above percentages: styrene, methyl methacrylate, isobornyl methacrylate, ethyl hexyl methacrylate, isobutyl methacrylate, and hydroxy ethyl methacrylate. Most preferably, compatible blends of two or more of the above acrylic polymers are used.

Optionally, the acrylic polymer can contain about 0.5–2% by weight, based on the weight of acrylic polymer, of acrylamide or methacrylamide such as n-tertiary butyl acrylamide or methacrylamide, copolymerized with the acrylic polymer.

The polyol ingredient in component (A) is, as stated above, the reaction product obtained by mixing together organic polyisocyanate and polyhydroxyltertiary amine, with the resultant polyol being present in (A) as a mixture with the acrylic polymer in solution in the liquid carrier.

With respect to the polyhydroxyl-tertiary amine reactant, its essential components are the presence of at least one tertiary amine nitrogen atom and a plurality of hydroxyl groups, with at least two of the hydroxyl groups being bonded to at least one of the nitrogen atoms via a bifunctional group which contains at least two carbon atoms, i.e. the —OH substitution is no closer than beta to the nitrogen atom. This relationship between —OH groups and amine nitrogen is carried over into the polyol reaction product. The bifunctional group can be an aliphatic group preferably containing 2 to 12 carbon atoms. When the tertiary amine has two nitrogen atoms, preferably at least one —OH group is indirectly substituted onto each nitrogen atom as described above. The polyol is non-reactive with the acrylic polymer and can be used in the composition of the present invention as a single polyisocyanate/polyhydroxyltertiary amine reaction product or as a mixture of different polyisocyanate/polyhydroxyl-tertiary amine reaction products.

Polyhydroxyl-tertiary amines that can be used to make the polyol of the present invention include those represented by the formula

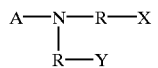

wherein k is alkylene or oxyalkylene containing 0 to 6 carbon atoms and X and Y are independently $R_1H$, wherein $R_1$ is —$(CH_2CH_2O)_n$— or —$(CH_2C(CH_3)HO)_n$—, wherein n is an integer of 1–3, and A is R—X, R—Y, $R_2$ or Z, wherein $R_2$ is an alkyl group containing 1–20 carbon atoms and

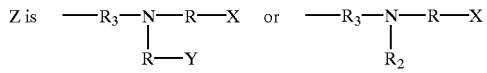

wherein $R_3$ is an alkylene group containing 1 to 10 carbon atoms, with the proviso that at least two, preferably at least three, —OH groups (provided by $R_1H$) are present. Preferably, R when present is alkylene containing 2 to 4 carbon atoms, $R_1$ is —$CH_2CH_2O)_n$—, wherein n is 1 or 2, $R_2$ is an alkyl group containing 1–4 carbon atoms or 8 to 20 carbon atoms, and $R_3$ is an alkylene group containing 2 to 6 carbon atoms. The combination of R and $R_1$ form one embodiment of aliphatic group indirectly connecting the —OH group to the nitrogen atom.

Examples of polyhydroxyl-tertiary amines include simple compounds such as N,N-diethanol alkyl amine, triethanol amine and more complicated compounds which can be considered as oligomers, such as the Ethomeen® (one tertiary amine nitrogen atom) and Ethoduomeen® (two tertiary amine nitrogen atoms) compounds available from Akzo Nobel. Examples of these compounds in which only one tertiary amine nitrogen is present are represented by the formula

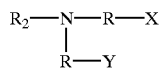

wherein $R_2$, R, X, and Y have the same meaning as described above and wherein $R_2$ preferably has 8 to 20 carbon atoms. Examples of group $R_2$ are tallow, oleyl, coco, and soya. A preferred group of compounds are the diethoxylates characterized by the formula

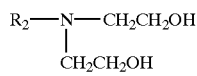

Wherein $R_2$ contains 8–20 carbon atoms. Examples of compounds containing two tertiary amine nitrogen atoms include the Ethoduomeens such as the compound having the formula

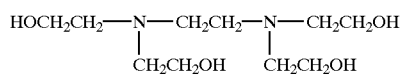

and the compounds having the formula

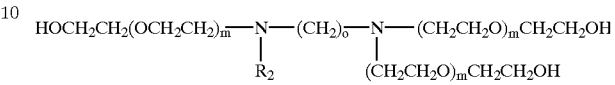

Wherein m is an integer independently selected from the group 0, 1, or 2, and o is an integer of from 1 to 4.

In the Ethomeen® and Ethoduomeen® compounds containing the $R_2$ group, such group is a mixture of alkyl groups as shown in the following Table A.

TABLE A

| Alkyl | Approximate Alkyl Wt. % Distribution |||||||||
|---|---|---|---|---|---|---|---|---|---|
| | Decyl | Dodecyl | Hexadecyl | Octadecyl | Oleyl | Oleyl | Coco | Soya | Tallow | Hydrogenated Tallow |
| Saturated | | | | | | | | | | |
| C8 | 4 | | | | | | 6 | | | |
| C10 | 90 | 1 | | | | | 7 | | | |
| C12 | 6 | 95 | | | 0.5 | 0.5 | 51 | 0.5 | | |
| C14 | | 3 | | | 1.5 | 1.5 | 19 | 1 | 3 | 3.5 |
| C15 | | | 0.5 | | | | | 0.5 | | 0.5 |
| C16 | | 1 | 91 | 9 | 4 | 4 | 9 | 16 | 29 | 31 |
| C17 | | | 1.5 | 2 | 0.5 | 0.5 | | | 1 | 1 |
| C18 | | | 7 | 87 | 14 | 8 | 2 | 15 | 20 | 61 |
| Unsaturated | | | | | | | | | | |
| C14' | | | | | 0.5 | 0.5 | | | 0.5 | |
| C16' | | | | | 4 | 4 | | 1 | 2 | |
| C18' | | | | 2 | 70 | 74 | 6 | 49.5 | 44 | 3 |
| C18" | | | | | 5 | 7 | | 13 | | |

The organic polyisocyanate reactant to make the polyol of the present invention can be a single polyisocyanate or a blend of different polyisocyanates and can be represented by the formula

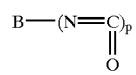

wherein B is an aliphatic or aromatic nucleus of the polyisocyanate and p is an integer of at least 2. Generally, p will be an integer of no greater than 6.

Any of the conventional aromatic and aliphatic diisocyanates, trifunctional isocyanates and isocyanate functional addition compounds of a polyol and a diisocyanate may be used as the reactant to make the polyol of the present invention. The aliphatic polyisocyanate can be cycloaliphatic.

From the following, it will be seen that nuclei B can have a wide variety of identities. Typically useful diisocyanates are 1,6-hexamethylene diisocyanate, isophorone diisocyanate, 4,4'-biphenylene diisocyanate, toluene diisocyanate, bis cyclohexyl diisocyanate, tetramethylene xylene diisocyanate, ethyl ethylene diisocyanate, 2,3-dimethyl ethylene diisocyanate, 1-methyltrimethylene diisocyanate, 1,3-cyclopentylene diisocyanate, 1,4-cyclohexylene diisocyanate, 1,3-phenylene diisocyanate, 1,5-naphthalene diisocyanate, bis(4-isocyanatocyclohexyl)-methane, 4,4'-diisocyanatodiphenyl ether and the like.

Typical trifunctional isocyanates that can be used are triphenylmethane triisocyanate, 1,3,5-benzene triisocyanate, 2,4,6-toluene triisocyanate and the like. Trimers of other diisocyanates also can be used such as the trimer of hexamethylene diisocyanate (HDI) which is sold under the tradename "Desmodur" N-3300 or N-3390 or "Tolonate" HDT or HDT-LV. Trimer of isophorone diisocyanate (IPDI) can also be used. In forming the trimer from isophorone diisocyanate, one of the isocyanate groups forms an isocyanurate group; the resultant trimer, however, has three isocyanate groups. Typically useful IPDI trimers are sold under the tradenames "Desmodur" Z-4470 BA or SN/BA or SN or MPA/X. The IPDI trimer offers the resulting coating improved hardness on curing.

Isocyanate functional addition compounds can also be used that are formed from an organic polyisocyanate and a polyol (the reaction forming the addition compound uses up the —OH groups of the polyol). Any of the aforementioned polyisocyanates can be used with a polyol to form an addition compound. Polyols such as trimethylol alkanes like trimethylol propane or ethane can be used. One useful adduct is the reaction product of tetramethylxylidene diisocyanate and trimethylol propane and is sold under the tradename "Cythane" 3160.

The reaction between the polyisocyanate and the polyhydroxyl-tertiary amine occurs merely by mixing these ingredients together such as at ambient temperature and atmosphereric pressure, although it is preferred to carry out the reaction in an inert atmosphere, such as under a nitrogen blanket. It is preferred that the reaction occurs by one molecule of the polyhydroxyl-tertiary amine reacting with only one isocyanate group of the polyisocyanate, whereby the polyol reaction product can be represented by the formula

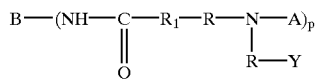

wherein A, B, Y, R, $R_1$ and p have the same meaning as stated above. The reaction favors the formation of this reaction product if in the course of mixing the reactants together, the amine reactant is maintained in an excess amount (molecules of amine vs. molecules of polyisocyanate), whereby the overall reaction product will contain at least 50 mol % of this favored reaction product. The amine reactant can be maintained in excess by slowly adding the polyisocyanate reactant to a solution of the polyhydroxyl-tertiary amine reactant and letting the resultant reaction stand for a period of time to allow essentially all of the isocyanate groups to react. The slow addition can be dropwise addition. Preferably, the polyisocyanate addition is carried out at a rate of not more than 20 wt %/min, and more preferably, not more than 10 wt %/min until 100 wt % of the polyisocyanate is added to the amine reactant. Even under this slow addition processs, one molecule of the polyhydroxyl-tertiary amine can add to multiple isocyanate groups of the same molecule of polyisocyanate reactant to form the reaction product represented by the formula

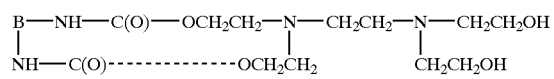

wherein B has the same meaning as above. It is even possible for the hydroxyl groups of one molecule of polyhydroxyl-tertiary amine to react with isocyanate groups of different molecules of the polyisocyanate reactant.

The combination of the hydroxyl-containing acrylic polymer and the polyol of the present invention (component (A)) crosslinked with the polyisocyanate (component (B)) to be described hereinafter produces a clear, tough glossy film coating. The proportions of the acrylic polymer and polyol required to produce this result, along with quick curing will depend on the particular acrylic polymer and polyol selected, and to some extent on the particular polyisocyanate selected as component (B). Preferably, however, an effective amount of the polyol of the present invention will be present to reduce the curing time so that water spot damage does not occur after one hour after application of the coating, followed by drying at ambient temperature (20° C.). Typically, the amount of the polyol needed to achieve this goal will be from 1 to 20 wt % of component (A).

Component (A) can further contain a hydroxyl- terminated polyester such as that having a weight average molecular weight (Mw) not exceeding about 3,000 (oligomer), preferably about 200–2,000, and a polydispersity (Mw divided by Mn) of less than about 1.7.

Typically useful such oligomers include caprolactone oligomers containing terminal hydroxyl groups which may be prepared by initiating the polymerization of caprolactone with a cyclic polyol, particularly a cycloaliphatic polyol, in the presence of a tin catalysts via conventional solution polymerization techniques. Such caprolactone oligomers are well known and described at length in Anderson et al. U.S. Pat. No. 5,354,797, issued Oct. 11, 1994. Epsilon($\epsilon$)-caprolactone is typically employed as the caprolactone component in a 1/1 to 5/1 molar ratio with a cycloaliphatic diol. Typically useful cycloaliphatic polyol monomers include 1,4-cyclohexanediol, 1,4-cyclohexane dimethanol, and 2,2'-bis(4-hydroxycyclohexyl) propane. Preferred caprolactone oligomers are formed from—caprolactone and 1,4-cyclohexanedimethanol reacted in a molar ratio of 2/1 to 3/1.

Other useful oligomers include alkylene oxide polyester oligomers containing terminal hydroxyl groups which may be made by reacting stoichiometric amounts of a cycloaliphatic monomeric anhydride with a linear or branched polyol in solution at elevated temperatures in the presence of a tin catalyst using standard techniques and then capping the acid oligomers so formed with monofunctional epoxies, particularly alkylene oxide, under pressure above atmospheric but not exceeding about 200 psi and at temperatures of 60–200° C. for 1 to 24 hours. Such alkylene oxide oligomers are well known and described at length in Barsotti et al. PCT Application No. U.S. Ser. No. 98/23337, published May 14, 1999.

Cycloaliphatic anhydride monomers such as hexahydrophthalic anhydride and methyl hexahydrophthalic anhydride are typically employed in the alkylene oxide oligomers above. Aliphatic or aromatic anhydrides, such as succinic anhydride or phthalic anhydride may also be used in conjunction with the anhydrides described above. Typically useful linear or branched polyols include, hexanediol, 1,4-cyclohexane dimethanol, trimethylol propane, and pentaerythritol. Useful monofunctional epoxies include alkylene oxides of 2 to 12 carbon atoms. Ethylene, propylene and butylene oxides are preferred although ethylene oxide is most preferred. Other epoxies, such as "Cardura" E-5 or "Cardura" E-10 glycidyl ether, supplied by Exxon Chemicals, may be used in conjunction with the monofunctional epoxies described above. Particularly preferred alkylene oxide oligomers are formed from methyl hexahydrophthalic anhydride; either 1,4-cyclohexanedimethanol, trimethylol propane, or pentaerythritol; and ethylene oxide reacted in stoichiometric amounts.

Compatible blends of any of the aforementioned hydroxyl-terminated polyesters can be used as well in the hydroxyl component (A) of the binder. Generally, 0 to 39 wt %, based on the total weight of component (A) of the hydroxyl-terminated polyester will be present, and preferably the amount will be 1 to 20 wt %.

The polyisocyanate component (B) of the binder coating composition includes an organic polyisocyanate as the crosslinking agent. The organic polyisocyanate can be a single polyisocyanate or a blend of different polyisocyanates.

Any of the conventional aromatic, aliphatic, cycloaliphatic diisocyanates, trifunctional isocyanates and isocyanate functional addition compounds of a polyol and a diisocyanate may be used as or in the polyisocyanate component (B).

Typical useful diisocyanates, triisocyanates and isocyanate functional addition compounds that can be used in component (B) are the same as disclosed above as reactants with the polyhydroxyl-tertiary amine to form the polyol of the present invention. Just as in the case of forming the polyol of the present invention, when the polyisocyanate used in component B contains IPDI trimer, the resulting coating exhibits improved hardness on curing. Thus IPDI trimer can be incorporated into the coating composition either by the polyol of the present invention in component (A) or as part of component (B) or by both.

In the present invention, the polyisocyanate component (B) contains 0%, but preferably at least 3% up to about 50% by weight, more preferably about 5–30% by weight, of the IPDI trimer, based on the weight of component (B). Excessive IPDI trimer tends to cause the film coating to become too brittle, whereby the coating film will crack over time.

One particularly preferred polyisocyanate crosslinking component comprises a mixture of about 5–45% by weight IPDI trimer and about 55–95% by weight HDI trimer, based on the total weight of component (B). The preferred amount of IPDI trimer for use in combination with HDI trimer is 5 to 30 wt %. It is generally preferred to employ an HDI trimer in combination with the IPDI trimer to retain flexibility in the coating film.

The hydroxyl and polyisocyanate components (A) and (B), respectively are preferably employed in an equivalent ratio of isocyanate groups to hydroxyl groups of 0.8/1 to 2.0/1.

The coating composition also contains a sufficient amount of catalyst (component (C)) to cure the composition at ambient temperature. A combination of certain catalysts is preferred when IPDI trimer is present, to accelerate the curing rate of IPDI trimer at room temperature to achieve the high film hardness offered by IPDI in a relatively short period of time, with little or no pot life reductions or die-back in the coating film formed therefrom. Even at these accelerated curing rates, the coating compositions remains processable for at least 30 minutes at ambient temperatures which provides enough time to complete the refinish job without the need for viscosity adjustments, and the high gloss coating film formed therefrom shows virtually no signs of dying back to a dull fuzzy finish over time.

The catalyst comprises at least one organotin tin compound, optionally at least one tertiary amine, and optionally, at least one organic acid in amounts described below (catalyst system).

Typically useful organotin compounds include organotin carboxylates, particularly dialkyl tin carboxylates of aliphatic carboxylic acids, such as dibutyl tin dilaurate (DBTDL), dibutyl tin dioctoate, dibutyl tin diacetate, and the like. Although not preferred, any of the other customary organotin or organometallic (Zn, Cd, Pb) catalysts could also be used. The amount of organotin catalyst employed in the coating composition can vary considerably depending on the specific binder system and the degree of initial hardness desired. However, it is critical that the coating composition contains enough organotin catalyst to cure the composition at ambient temperatures, while at the same time being insufficient to cause die-back.

Generally, about 0.005–0.2% by weight, based on the weight of the binder (components (A)+(B)+(C)), of organotin catalyst will be sufficient to impart the desired properties. It has been found that above the upper limit of 0.2%, the curing reaction is too fast and die-back results. Below about 0.005%, the curing reaction is too slow and insufficient hardness and poor mechanical properties develop. The organotin catalyst can be used by itself as the sole catalyst ingredient.

Typically useful tertiary amines useful as a co-catalyst in catalyst component (C), as distinguished from the polyhydroxyl-tertiary amine used to form the polyol in component (A), include tertiary aliphatic monoamines or diamines, particularly trialkylene diamines, such as triethylene diamine (DABCO), N-alkyl trimethylenediamine, such as N,N,N'-trimethyl-N'-tallow- 1,3-diaminopropane, and the like; and trialkylamines such as tridodecylamine, trihexadecylamine, N,N'-dimethylalkyl amine, such as N, N'-dimethyldodecyl amine, and the like, all free of —OH groups. The alkyl or alkylene portions of these amines may be linear or branched and may contain 1–20 carbon atoms. Especially preferred are amines that contain at least 6 carbon atoms in at least one of their alkyl or alkylene portions to lower the hazing in humid conditions.

As with the amount of organotin compound, the amount of tertiary amine in the catalyst system employed in the coating composition can vary considerably, it being desired only that tertiary amine if present, be present in an amount which, together with the above, including component (A), will cause the composition to cure (sufficient for buffability) at ambient temperature within three hours, preferably within two hours. Generally, about 0.01–1% by weight, based on the weight of the binder, of tertiary amine will be sufficient to impart the desired properties. Above the upper limit of about 1%, the tertiary amine offers longer dust drying times and provides the film with insufficient hardness. Below about 0.01%, the catalytic effect is generally inadequate.

An organic acid is also included in the catalyst system for increased pot life.

A pot life of at least 30 minutes at ambient temperatures is generally sufficient for completion of a refinish job. Typically useful acid catalysts are formic acid, acetic acid, proponic acid, butanoic acid, hexanoic acid, and any other aliphatic carboxylic acid, and the like. Generally, about 0.005–1%, based on the weight of the binder, of acid is employed.

It has been found that the three-component catalyst system described above offers a higher cure response than organotin, amine, or acid alone.

To improve weatherability of the composition about 0.1–10% by weight, based on the weight of the binder, of ultraviolet light stabilizers screeners, quenchers and antioxidants can be added. Typical ultraviolet light screeners and stabilizers include the following:

Benzophenones such as hydroxy dodecyloxy benzophenone, 2,4-dihydroxy benzophenone, hydroxy benzophenones containing sulfonic acid groups and the like.

Benzoates such as dibenzoate of diphenylol propane, tertiary butyl benzoate of diphenylol propane and the like.

Triazines such as 3,5-dialkyl-4-hydroxyphenyl derivatives of triazine, sulfur containing derivatives of dialkyl-4-hydroxy phenyl triazine, hydroxy phenyl-1,3,5-triazine and the like.

Triazoles such as 2-phenyl-4-(2,2'-dihydroxy benzoyl)-triazole, substituted benzotriazoles such as hydroxyphenyltriazole and the like.

Hindered amines such as bis(1,2,2,6,6 entamethyl-4-piperidinyl sebacate), di[4(2,2,6,6, tetramethyl piperidinyl)] sebacate and the like and any mixtures of any of the above.

Generally, flow control agents are used in the composition in amounts of about 0.01–5% by weight, based on the weight of the binder, such as polyacrylic acid, polyalkylacrylates, polyether modified dimethyl polysiloxane copolymer and polyester modified polydimethyl siloxane.

When used as a clear coating, it may be desirable to use pigments in the clear coating composition which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

The coating composition of the present invention also contains the customary organic solvents in the organic liquid carrier portion. As previously described, the amount of organic solvent(s) added depends upon the desired binder level as well as the desired amount of VOC of the composition. Typical organic solvents consist of aromatic hydrocarbons, such as petroleum naphtha or xylenes; ketones, such as methyl amyl ketone, methyl isobutyl ketone, methyl ethyl ketone, or acetone; esters, such as butyl acetate or hexyl acetate; and glycol ether esters, such as propylene glycol monomethyl ether acetate. Examples of solvents which do not contribute to the VOC of the composition include methyl acetate, acetone, 1-chloro, 4-trifluoromethyl benzene, and potentially t-butyl acetate.

The coating composition of this invention is preferably prepared as a "two-component" or "two-pack" coating composition, wherein the two reactive binder components (A) and (B) are stored in separate containers, which are typically sealed. The catalyst (component (C), organic solvent, and usual other additives may be added to either or both the hydroxyl or crosslinking components, depending upon the intended use of the composition. However, these additives (except for some solvent) are preferably added to and stored in the same container with the hydroxyl component (A). The contents of the hydroxyl and isocyanate component containers are mixed in the desired NCO/OH ratio just prior to use to form the activated coating composition, which has a limited pot life. Mixing is usually accomplished simply by stirring at room temperature just before application. The coating composition is then applied as a layer of desired thickness on a substrate surface, such as an autobody part, including the entire autobody. After application, the layer dries and cures to form a coating on the substrate surface having the desired coating properties.

Generally, the coating composition of this invention is used as a clearcoat in automotive refinishing, but it should be understood that it can also be used as a clearcoat finish or can be pigmented with conventional pigments and used as a monocoat or as a basecoat in a clearcoat/colorcoat finish or refinish.

In the application of the coating composition as a clearcoat refinish to a vehicle part such as an automobile or a truck body or portion thereof, the basecoat which may be either a solvent based composition or a waterborne composition is first applied and then dried sufficiently to form a stable basecoat for the clear coat before the clearcoat is applied usually wet-on-wet by conventional spraying. Electrostatic spraying also may be used. In refinish applications, the composition is preferably dried and cured at ambient temperatures but can be forced dried and cured in paint booths equipped with heat sources at slightly elevated booth temperatures of, in general, about 30–100° C., preferably about 35–65° C., for a short time of about 3–30 minutes, preferably about 5–15 minutes. The coating so formed is typically about 0.5–5 mils (0.012 to 0.12 mm) thick.

In these refinish applications, in particular, the clearcoat of this invention has been found to greatly improve the productivity of a refinish operation. Through incorporation of a mixture of hydroxy-containing polyacrylic resin, polyol of the present invention, polyisocyanate, preferably containing some IPDI trimer, and effective catalysts, the composition when used as a clearcoat dries and cures in a relatively short time after application to a dust free, water resistant, and sufficiently hard state for sanding (wet or dry) or buffing, unexpectedly with minimum pot life reductions and without die-back consequences, which allows the vehicle to be buffed, moved out of the way, and delivered to the customer on the same day of application, in comparison to the next day offered by conventional clear coat compositions. The composition of this invention, in particular, exhibits a pot life of at least 30 minutes at ambient temperature, dust free time within 10 minutes or less at ambient temperatures, and water spot free and wet sand or buff time within 3 hours, preferably within 2 hours, and even as soon as one hour, at ambient temperatures. The foregoing properties can be achieved much faster by curing the composition at slightly elevated temperatures of, in general, about 55–65° C. peak substrate temperature for about 3–10 minutes, and preferably about 60° C. for about 6 minutes, which remarkably allows the clear finish to be sanded or buffed immediately on cool down. Furthermore, the finish remains sandable or buffable for several days up to one week before it cures to a tough, hard durable exterior automotive finish.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, thermoplastic olefin (TPO), reaction injection molded urethanes and partially crystalline polyamides, as well as wood and aluminum substrates.

EXAMPLES

Test Procedures

The following test methods were used to evaluate the coatings:

The film hardness is another indication of when the coating film is ready to be sanded, buffed or polished. The coating film alone must have a Persoz hardness of at least 35 sec. (counts), preferably in the range of about 40–150 counts, at a film thickness of 2.2 mils when measured on a previously uncoated cold rolled steel (Q) panel before it can be sanded, buffed or polished, and this is the criterion and test conditions used in the Examples. Persoz hardness is determined by a GARDCO® Pendulum Hardness Tester Model HA-5854 manufactured by BYK Chemie, Germany and sold by Paul N. Gardness Company, Inc. Pompano Beach, Fla.

The coating must also be water spot free before it is ready to be wet sanded or stored in the rain. If water spot damage is formed on the film, this is an indication that the cure is not complete and further curing is needed before the film can be wet sanded or exposed to rainy weather conditions. The water spot free time was determined by putting a water drop on the refinish film for every 15 min. and up to 24 hours. The water will damage the film if it is not cured. As a consequence, the water drop will form a damage ring on the refinish panel. The degree of damage is rate from 1 to 10 scale. A score of 10 indicates no damage while 1 indicates severe water spotting.

The die-back was determined visually by one skilled in the art. One skilled in the art compares the initial gloss and DOI (distinctness of image) of the coating film with the gloss and DOI after the film is allowed to dry overnight. If there is a significant drop in the gloss and DOI levels, such that the coating film has a dull fuzzy appearance, die-back is said to result.

Example 1

Hydroxyl-containing acrylic polymer (acrylic polymer 1) was prepared by charging the following constituents into a polymerization reactor equipped with a heating mantel, a stirrer, thermometer, addition funnel, nitrogen purge and reflux condenser.

|  | Parts By Weight |
| --- | --- |
| Portion 1 | |
| Xylene | 56 |
| Portion 2 | |
| Methyl ethyl ketone | 10 |
| Styrene monomer | 15 |
| Isobutyl methacrylate monomer | 45 |
| Methyl methacrylate monomer | 20 |
| Hydroxy ethyl methacrylate monomer | 20 |
| Portion 3 | |
| T-butyl peracetate solution (75% solids in mineral spirits) | 3.0 |
| Total | 170 |

Portion 1 was added to the reactor and heated to its reflux temperature. Portions 2 and 3 were then added together at a uniform rate to the reactor over a three hour period while the resulting reaction mixture was maintained at its reflux temperature. The reaction mixture was held at reflux for an additional hour. The resulting acrylic polymer solution had a polymer solids content of about 60%. The polymer had a weight average molecular weight (Mw) of about 10,500 and a glass transition temperature (Tg) of about 58° C.

A tetrahydroxyl-terminated polyester oligomer (oligomer 1) was prepared by charging the following constituents into a high pressure reaction vessel and heated to 140° C.

| Ingredients | Weight (grams) |
| --- | --- |
| Propylene glycol monoethyl ether acetate | 240 |
| Pentaerythritol | 136 |
| Triethylamine | 0.23 |

To the reaction vessel, 645 gm of methylhexahydrophthalic anhydride was then added over one hour. The batch was held at 140° C. for 6 hr. The batch was then cooled to 25° C., the reaction vessel was then sealed, and 173 gm of ethylene oxide was added, followed by heating the batch to 110° C. and holding at that temperature for 6 hr. Excess ethylene oxide was then removed by purging the batch with nitrogen. The acid number of the resultant oligomer (solids) was 10 mg KOH/gm. The resulting solution of oligomer 1 had an 80% by wt. solids content. The oligomer was tetrahydroxyl-substituted and these were all primary functionalities. The oligomer also had a Mw of about 1,000, a Tg of about 0° C., and a polydispersity (Pd) of about 1.1.

The polyhydroxyl-tertiary amine used in this Example was triethoxylated N-tallow-1,3-diaminopropane available as Ethoduomeen® T/13 by Akzo Nobel Co. It has 3 hydroxyl groups and 2 tertiary amines. For simplicity, this is called oligomer 2.

A polyol of the present invention was prepared from oligomer 2 and IPDI trimer, as follows: At ambient temperature, to a one quart reaction vessel equipped with a mechanical stirrer, was added 124 g of oligomer 2 and 53.1 g of butyl acetate. 89.9 g of IPDI trimer (70 wt % solids in butyl acetate), available as Desmodur® Z-4470 BA, was then slowly added to the reaction vessel, i.e, the addition was carried out substantially uniformly over a fifteen min. period. The contents of the reaction vessel was stirred during this addition and for two hr. thereafter under nitrogen blanket. The reaction vessel was then left stand for 7 days to complete the reaction, i.e. all of the isocyanate groups of the IPDI were reacted with at least one of the hydroxyl groups of oligomer 2, leaving excess hydroxyl groups as the terminal groups of the compound, i.e. the polyol. The polyol is called oligomer 3 in this Example. Oligomer 3 was an inseparable mixture of reaction product in which molecules of oligomer 2 were reacted with the IPDI trimer through one, two, and three hydroxyl groups of the oligomer 2, although about 70 mol % of the polyol involved the addition of only one molecule of polyhydroxyl-tertiary amine to each isocyanate group of the polyisocyanate. This was confirmed by GPC analysis (major peak at Mn 2840).

A clear coating composition was made by first forming components 1 and 2 and then mixing these components together. Component 1 was prepared by first making up concentrate 1 as follows:

| Concentrate 1 | |
| --- | --- |
| Ingredient | Parts by weight |
| Xylene | 3.8 |
| Ethyl acetate | 2.0 |
| N,N-dimethyl dodecyl amine | 0.32 |
| Tinuvin ® 292 ((1,2,2,6,6-pentamethyl-4-piperidenyl)-sebacate) | 0.58 |
| Tinuvin ® 328 (2-(2-hydroxy-3,5-ditertiary amyl phenyl)-2H-benzotriazole) | 0.58 |
| Byk ® 325 (polysiloxane polyether copolymer) | 0.386 |
| Dibutyl tin laurate | 0.04 |
| Toluene | 2.94 |
| Methyl ethyl ketone | 5.88 |
| Acetone | 47.06 |
| Acetic acid | 0.164 |
| Triethylenediamine | 0.04 |
| Total | 63.75 |

Concentrate 1 was then used to form component 1 having the following compositions:

| Component 1, Case 1 | Parts by Weight |
|---|---|
| Concentrate 1 | 64 |
| Acrylic polymer 1 solution | 100 |
| Butyl acetate | 26 |
| Total | 190 |

| Component 1, Case 2 | Parts by Weight |
|---|---|
| Concentrate 1 | 64 |
| Acrylic Polymer 1 solution | 95 |
| Butyl acetate | 26 |
| Oligomer 1 solution | 3.5 |
| Total | 188.5 |

| Component 1, Case 3 | Parts by Weight |
|---|---|
| Concentrate 1 | 64 |
| Acrylic Polymer 1 solution | 95 |
| Butyl acetate | 26 |
| Oligomer 3 solution | 4.2 |
| Total | 189.2 |

The polyisocyanate component (component 2) of the clear coating composition was prepared as the following composition:

| Component 2 | Parts by Weight |
|---|---|
| Desmodur ® N-3300 (1,6-hexamethylene Diisocyanate trimer, 100% solids) | 21 |
| Butyl acetate | 9 |
| Methyl amyl isoketone | 5 |
| Total | 35 |

Clear coating compositions were made by mixing together components 1 and 2 described above, followed by spraying them onto test panels and drying at ambient temperature. The weight proportions of components 1 and 2 were as follows:

| Coating Composition | Component 1 | Component 2 |
|---|---|---|
| 1 | 190 | 35 |
| 2 | 188.5 | 35 |
| 3 | 189.2 | 35 |

Each of these compositions had a binder solids content of 37 wt % and a VOC content of 4.26 (0.51 kg solvent/l. of composition). Further details of each composition and their test results after application are shown in Table 1 (composition 3 is an example of the coating composition of the present invention).

TABLE 1

| Coating Composition | 1 | 2 | 3 |
|---|---|---|---|
| Acrylic polymer 1 (wt % solids) | 100 | 95 | 95 |
| Oligomer 1 (wt % solids) | 0 | 5 | 0 |
| Oligomer 3 (wt % solids) | 0 | 0 | 5 |
| NCO/OH equivalent ratio (component 2/component1) | 1.2 | 1.13 | 1.08 |
| Water spot (10 = best) | | | |
| After 30 min | 5 | 4 | 7 |
| After 45 min | 8 | 7 | 9.5 |
| After 60 min | 9.5 | 9 | 10 |
| Persoz hardness (sec) | | | |
| After 3 hr | 35 | 30 | 69 |

Composition 3 of the present invention exhibited improved early resistance to water spotting and much better early hardness than the comparison compositions, being buffable in about 1-½ hr after application of the film coating. The hardness after 24 hr was about the same for all three compositions. The film coating of composition 3 was also dust-free faster than the film coatings from compositions 1 and 2, i.e. about 5 min for composition 3 as compared to about 10 min for compositions 1 and 2.

Example 2

Oligomer 3 in Example 1 was made by reacting together triethoxylated N-tallow-1,3-diaminopropane with IPDI trimer. In this Example 2, different polyhydroxy-tertiary amines are reacted with IPDI trimer to obtain the oligomer 4 series of polyols in solution (70 wt % solids) using the same procedure as described in Example 1 and the weight proportions of each ingredient present in the reaction were as follows:

| Oligomer 4 Ethomeen ® | IPDI Trimer | Butyl Ac. |
|---|---|---|
| -1 C-12-124 | 146 | 53 |
| -2 S-12-124 | 121 | 53 |
| -3 O-12-124 | 120 | 53 |
| -4 T-12-124 | 121 | 53 |
| -5 octadecyl-12-124 | 117 | 125 |
| -6 * - 97 | 58.3 | 31.4 |

* The polyhydroxy-tertiary amine used in composition 4-6 was a mixture of ingredients in the following weight proportions: oligomer 1 (37)/oligomer 2 (30)/Ethomeen ® C-12(30)/IPDI trimer (58.3)/butyl acetate (31.4).

In this Table, C, S, 0 and T mean coco, soya, oley, and tallow, respectively, and "12" is not the carbon atom count as in Table A above, but instead has the following meaning: In "12", the "1" indicates the number of —$CH_2CH_2O$— groups and the "2" indicates number of $CH_2CH_2O$ branches from the nitrogen atom. Thus, Ethomeen C-12 has the following formula:

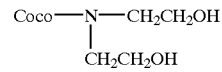

Component 1 in this Example is made using the following concentrate:

| Concentrate 2 | |
|---|---|
| Ingredient | Parts by weight |
| Acrylic polymer 1 solution | 95 |
| Butyl acetate | 26 |
| Ethyl acetate | 2.0 |
| N,N-dimethyl dodecyl amine | 0.33 |
| Tinuvin ® 292 ((1,2,2,6,6-pentamethyl-4-piperidenyl)-sebacate) | 0.58 |
| Tinuvin ® 328 (2-(2-hydroxy-3,5-ditertiary amyl phenyl)-2H-benzotriazole) | 0.58 |
| Byk ® 325 (described above) | 0.19 |
| Byk 333 ® (polysiloxane-modified polyester) | 0.386 |
| Dibutyl tin laurate | 0.04 |
| Toluene | 4.94 |
| Methyl ethyl ketone | 5.88 |
| Acetone | 47.06 |
| Acetic acid | 0.16 |
| Triethylenediamine | 0.04 |
| Total | 183 |

Component 1 is made by mixing together concentrate 2 with oligomers 4 as follows:

| Component 1, Cases 1–4 and 6 | Parts by Weight |
|---|---|
| Concentrate 2 | 183 |
| Oligomers 4-1, 4-2, 4-3, 4-4, and 4-6 solution | 4.2 |
| Total | 187.2 |

| Component 1, Case 5 | Parts by Weight |
|---|---|
| Concentrate 2 | 183 |
| Oligomer 4-5 solution | 5.3 |
| Total | 188.3 |

The polyisocyanate component (component 2) was prepared having the following composition:

| Component 2, Cases 1–6 | Parts by Weight |
|---|---|
| Desmodur ® N-3300 (as described above) | 21 |
| Butyl acetate | 9 |
| Methyl amyl isoketone | 5 |
| Total | 35 |

To form the clear coating compositions each being 37 wt % solids, components 1 and 2 were mixed together in the following proportions: Compositions 1–4 and 6, 187.2/35, respectively, and Composition 5, 188.3/35, respectively. The compositions had an NCO/OH equivalency between 1.08 and 1.12, and the VOC for each composition was less than 4.3 (0.52 kg/l). The compositions were applied to test panels and dried at ambient temperature. Further details on composition and test results are shown in Table 2.

TABLE 2

| Coating Composition | 1 | 2 | 3 | 4 | 5 | 6 |
|---|---|---|---|---|---|---|
| Acrylic polymer 1 | 95 | 95 | 95 | 95 | 95 | 95 |
| Oligomer 4-1 | 5 | 0 | 0 | 0 | 0 | 0 |
| Oligomer 4-2 | 0 | 5 | 0 | 0 | 0 | 0 |
| Oligomer 4-3 | 0 | 0 | 5 | 0 | 0 | 0 |
| Oligomer 4-4 | 0 | 0 | 0 | 5 | 0 | 0 |
| Oligomer 4-5 | 0 | 0 | 0 | 0 | 5 | 0 |
| Oligomer 4-6 | 0 | 0 | 0 | 0 | 0 | 5 |
| Water spot (10 = best) | | | | | | |
| After 15 min | 5 | 6 | 6 | 6 | 7 | 7 |
| After 30 min | 10 | 10 | 10 | 10 | 10 | 10 |
| Persoz hardness (sec) | | | | | | |
| After 3 hr | 70 | 65 | 67 | 63 | 73 | 61 |

All of the coating films formed from these compositions exhibited outstanding early freedom from water spot damage and hardness. The film coatings could all be buffed in about 1-½ hr and were dust free in less than 5 min.

Example 3

In this Example, the presence of polyol of the present invention in the coating composition provided a film coating that could be buffed one hour after application (drying at ambient temperature).

In this Example, the hydroxy component of the coating composition had the following composition:

| | Component 1, Cases 7 and 8 | |
|---|---|---|
| | Parts by Weight | |
| Ingredient | Case 7 | Case 8 |
| Xylene | 8.29 | 6.27 |
| Ethyl acetate | 3.1 | 3.1 |
| N,N-dimethyl dodecyl amine | 0.27 | 0.25 |
| Tinuvin ® 292 (as described above) | 0.73 | 0.66 |
| Tinuvin ® 328 (as described above) | 0.73 | 0.66 |
| Byk ® 333 (as described above) | 0.05 | 0.04 |
| Dibutyl tin laurate | 0.08 | 0.07 |
| Toluene | 2.9 | 2.5 |
| Methyl isobutyl ketone | 5.85 | 4.8 |
| Acetone | 24.3 | 21.9 |
| Acetic acid | 0.28 | 0.25 |
| Methyl amyl ketone | 9.1 | 7.0 |
| Byk ® 358 (as described above) | 0.3 | 0.26 |
| Acrylic polymer 1 solution | 61.8 | 61.2 |
| Oligomer 3 | 0 | 0.7 |
| Butyl acetate | 12.3 | 9.2 |
| Triethylenediamine | 0.06 | 0.06 |
| Totals | 130.1 | 118.9 |

Component 2 had the following composition:

| | Parts by Weight |
|---|---|
| Desmodur ® N-3000 (as described above) | 62.6 |
| Desmodur ® Z-4470 BA (as described above) | 15.7 |
| Butyl acetate | 7.5 |
| Methyl amyl isoketone | 14.2 |
| Total | 100 |

The following coating compositions were prepared by mixing together components 1 and 2:

| Composition | Component 1 - g | Component 2 - g |
|---|---|---|
| Using case 7 comp. | 54 | 16 |
| Using case 8 comp. | 56.6 | 13.4 |

These compositions contained the following:

| Composition (wt %) | Using Case 7 Comp. | Using Case 8 Comp. |
|---|---|---|
| Acrylic polymer 1 | 100 | 98 |
| Oligomer 3 | 0 | 2 |
| IPDI trimer* | 15 | 15 |

*The wt % IPDI trimer is based on the total weight of polyisocyanate.

The case 8 composition is a composition of the present invention. Within one hour after spraying this composition onto a test panel, followed by air drying, the resultant coating film was both buffable and wet sandable. This indicates that the coating film was very quickly dust-free (within 5 min), was water-spot free and had a Persoz hardness of at least 35 sec. In comparison, the coating film using the case 7 composition of component 1, was too soft to be buffed at one hour after application, and was not ready for buffing until many hours after application. Drying at ambient temperature was used for both coating films.

Example 4

The following concentrate was prepared:

| Concentrate 3 | |
|---|---|
| Ingredient | Parts by Weight |
| Ethyl acetate | 2.4 |
| Tinuvin ® 292 (described above) | 0.58 |
| Tinuvin ® 328 (described above) | 0.58 |
| Byk ® 325 (described above) | 0.386 |
| Dibutyl tin dilauurate | 0.04 |
| Toluene | 2.94 |
| Methyl ethyl ketone | 5.88 |
| Acetone | 47.06 |
| Acetic acid | 0.164 |
| Total | 60 |

A clear coating compposiion was made by first forming components 1 and 2 and then mixing these cxomponents together. Component 1 had the followeing compositions:

| Component 1, Case 9 | |
|---|---|
| | Parts by Weight |
| Concentrate 3 | 60 |
| Acrylic polymer 1 solution | 100 |
| Butyl acetate | 26 |
| Total | 186 |

| Component 1, Case 10 | |
|---|---|
| | Parts by Weight |
| Concentrate 3 | 60 |
| Acrylic polymer 1 solution | 95 |
| Butyl Acetate | 26 |
| Oligomer 1 | 3.5 |
| Total | 184.5 |

| Component 1, Case 11 | |
|---|---|
| | Parts by Weight |
| Concentrate 3 | 60 |
| Acrylic polymer 1 solution | 95 |
| Butyl acetate | 26 |
| Oligomer 3 | 4.2 |
| Total | 185.2 |

Component 2 had the following composition:

| Component 2, Cases 9–11 | |
|---|---|
| | Parts by Weight |
| Desmodur ® 3300 (described above) | 18.9 |
| Desmodur ® 4470BA (described above) | 3.0 |
| Butyl Acetate | 8.1 |
| Methyl amyl isoketone | 5.0 |
| Total | 35 |

Components 1 and 2 were mixed together in the following proportions to form the clear coating composition (VOC content of 0.51 kg/l; 37 wt % solids):

| Coating composition | Amount of Component 1-g | Amount of Component 2-g |
|---|---|---|
| Case 9 | 186 | 35 |
| Case 10 | 184.5 | 35 |
| Case 11 | 185.2 | 35 |

These coating compositions were then applied to test panels and dried at ambient temperature. Further details of the composition and test results are presented in the following table:

TABLE 3

| Ingredient | Case 9 | Case 10 | Case 11 |
|---|---|---|---|
| Acrylic polymer 1 (solids) | 100 | 95 | 95 |
| Oligomer 1 (solids) | 0 | 5 | 0 |
| Oligomer 3 (solids) | 0 | 0 | 5 |
| IPDI Trimer (solids)* | 10 | 10 | 10 |
| NCO/OH | 1.18 | 1.11 | 1.06 |
| Water spot at ambient temperature | | | |
| After 30 min | 5 | 4 | 6 |
| After 45 min | 7 | 7 | 8 |
| After 60 min | 9 | 8 | 9.5 |

TABLE 3-continued

| Ingredient | Case 9 | Case 10 | Case 11 |
|---|---|---|---|
| Persoz hardness (sec) | | | |
| After 3 hr | 32 | 48 | 70 |

*The wt % IPDI trimer is base on the total weight of polyisocyanate making up component 2.

Composition Case 11 is the composition of the present invention. The coating film of this composition exhibits improved water spot resistance as compared to the other compositions and greatly improved cure rate, achieving buffability is about 1-½ hr. The coating film of composition 11 was dust free in about 5 min after application.

What is claimed is:

1. A coating composition containing a film forming binder and a volatile organic liquid carrier, wherein the binder contains hydroxyl-containing acrylic polymer and polyol prepared by reacting together polyhydroxy-tertiary amine with organic polyisocyanate, the polyhydroxyl-tertiary amine having at least two hydroxyl groups being bonded indirectly to a nitrogen atom of said amine through a chain containing at least two carbon atoms, essentially all of the isocyanate groups of said organic polyisocyanate being reacted with hydroxyl groups of said amine.

2. The coating composition of claim 1 wherein said binder constitutes component A of said composition and organic polyisocyanate is present as component B, the ratio of equivalents of isocyanate in (B) per equivalent of hydroxyl groups in (A) being in the range of 0.5/1 to 3.0/1, and an effective amount of catalyst to cure said composition is present as component C.

3. The coating composition of claim 2 wherein an effective amount of said polyol in said component (A) is present to increase the curing rate of said composition.

4. The coating composition of claim 2 wherein the amount of said hydroxyl-containing acrylic polymer is 40–99 wt % and the amount of said polyol is 1–60 wt %, based on the total weight of (A).

5. The coating composition of claim 2 wherein said component (A) contains 0–39 wt % of hydroxyl-terminated polyester, based on the total weight of (A).

6. The coating composition of claim 2 wherein the composition is a two-pack coating composition, comprising in the first pack, components A and C, and in the second pack, component B, wherein the contents of each pack are mixed together just prior to use.

7. The coating composition of claim 2 wherein said organic polyisocyanate present as component (B) contains 0–30 wt % of the trimer of isophorone diisocyanate, based on the total weight of component (B).

8. The coating composition of claim 2 wherein said polyhydroxyl-tertiary amine used in said polyol of component (A) contains two tertiary amine nitrogen atoms, each having at least one hydroxyl group indirectly bonded thereto through a chain containing at least two carbon atoms.

9. The coating composition of claim 2, wherein said polyhydroxyl-tertiary amine used in said polyol of component (A) has the formula

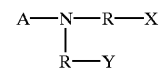

wherein R is alkylene or oxyalkyene containing 0 to 6 carbon atoms and X and Y are independently $R_1H$, wherein $R_1$ is $-(CH_2CH_2O)_n-$ or $-(CH_2C(CH_3)HO)_n-$, wherein n is an integer of 1–3, and A is R—X, R—Y, $R_2$ or Z, wherein $R_2$ is an alkyl group containing 1–20 carbon atoms and

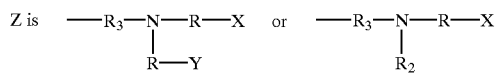

wherein $R_3$ is an alkylene group containing 1 to 10 carbon atoms, with the proviso that at least two hydroxyl groups are present.

10. The coating composition of claim 9 wherein said organic polyisocyanate used in said polyol of component (A) has the formula

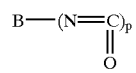

wherein B is an aliphatic or aromatic nucleus of said organic polyisocyanate and p is an integer of at least 2.

11. The coating composition of claim 10 including the polyol compound having the formula

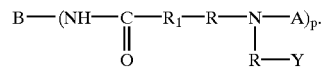

* * * * *